Aug. 24, 1965  J. H. STANLEY  3,201,859
FERRULE PRESETTING TOOL
Filed May 6, 1960

INVENTOR.
JOHN H. STANLEY
BY John N. Wolfram
ATTORNEY

United States Patent Office 3,201,859
Patented Aug. 24, 1965

3,201,859
FERRULE PRESETTING TOOL
John H. Stanley, Euclid, Ohio, assignor to Parker-Hannifin Corporation, Cleveland, Ohio, a corporation of Ohio
Filed May 6, 1960, Ser. No. 27,422
15 Claims. (Cl. 29—282)

This invention relates to hand tools for applying ferrules to tubes and is more particularly directed to a tool which utilizes replaceable die elements for accommodating various sizes of tubes and corresponding sizes of ferrules.

Tube couplings which grip and seal tubes by means of a ferrule contracted upon the tube so that it is unnecessary to perform a flaring operation upon the tube are well known in the art and are commonly refered to as flareless couplings. In order to obtain the maximum grip upon the tube for preventing pull-out, and for obtaining a positive fluid tight joint with the tube even though there may be surface imperfections in the tube, it is a preferred practice to utilize flareless couplings in which the forward end of the ferrule is moved along the tube and is cammed inwardly against the tube at the same time so that the forward edge of the ferrule will cut or shear its way into the outer surface of the tube to form a holding shoulder therein. A flareless coupling of this type is shown, for example, in the United States Patent No. 2,496,510 of J. N. Wolfram, dated February 7, 1950.

In flareless couplings of this type the ferrule is driven along the tube by a nut which has threaded connection with a body member and the body has a tapered flare mouth which cams the front end of the ferrule against the tube. When coupling tubes of relatively hard material, such as stainless steel, considerable camming force is required to be exerted by the body flare mouth for contracting the front end of the ferrule into cutting engagement with the tube. This high force may result in gouging of the flare mouth by the ferrule and also may result in spreading of the body portion surounding the ferrule so as to cause a binding of the threaded connection between the nut and body, unless the body is made of a hard or heat treated material and is made with sufficient section to provide enough strength to prevent spreading.

To avoid these detrimental effects without resorting to hard or heat treated materials for the body, which adds considerably to the expense, and to keep the size of the body within reasonable limits, the setting of the ferrule upon the tube may be accomplished in a tool made for this purpose. The coupling body and nut then need exert only enough force upon the ferrule to hold it in its preset position upon the tube.

Before presetting a ferrule on each end of a tube which has been cut to length and, if necessary, properly bent to fit the intended installation, the nut for the coupling to be connected to each end of the tube must be first slipped over the tube and pushed back from the end of distance sufficient to allow insertion of the ferrule to its proper position on the tube end and also to allow application of the ferrule presetting tool to the tube end. The coupling nut has a bore therethrough which closely fits the tube outer diameter and therefore the nut cannot be pushed onto bent portions of the tube where the tube will be slightly flattened or out of round due to bending. Oftentimes it is desirable to bend the tube as closely as possible to the couplings to be installed thereon. This means that the ferrule presetting tool should be of such design as to permit the coupling nut to be as close as possible to the ferrule when the ferrule is being preset upon the tube by the tool.

It is an object of the present invention to provide a ferrule presetting tool which may be quickly applied and removed from the tube and ferrule assembly.

It is another object to provide a tool of the type described which comprises common nut and body portions and replaceable die elements for accommodating various sizes of tubes and corresponding sizes of ferrules.

It is another object to provide a hand type ferrule presetting tool in which the parts may be sufficiently heavy so that full pressure may be applied for forcing the ferrule into sealing and holding engagement with the tube without spreading or damaging the tool parts.

It is another object to provide a readily portable hand tool of the type described in which the die elements may be readily removed from the tool nut and body portions and in which the tool may be used in close quarters in actual tubing installations.

It is another object to provide a hand tool of the type described in which the nut and body portions of the tool may be made of relatively soft and inexpensive material, such as cold rolled, steel, and in which only the replaceable die elements are of hardened steel.

It is another object to provide a tool of the type described in which a stop means is provided for limiting the amount which the tool contracts the ferrule upon the tube.

It is another object to provide a ferrule presetting tool having a split die insertible on the tube end behind the ferrule and with a nut fitting around the split die and engageable therewith for advancing it toward the ferrule, the nut having an internal diameter greater than the largest diameter of the coupling nut whereby when the coupling nut is positioned closely behind the split die the tool nut may be passed back over the coupling nut to permit removal of the split die from the tube after the presetting operation.

It is another object to provide a split die for a ferrule presetting tool in which provision is made for preventing the split edges of the die from coming in contact with the ferrule or tube and thus avoid scoring or gouging thereof during the presetting operation.

It is another object to provide a means for indicating when the ferrule has been preset a predetermined amount upon a tube.

Other objects of the invention will be apparent from the following description and from the drawings in which.

Figure 1:
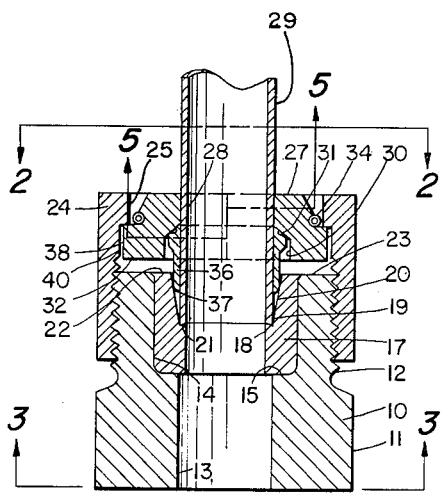
FIG. 1 is a longitudinal cross section view of the tool in position on a tube and ferrule assembly for starting the presetting operation.
Figure 2:
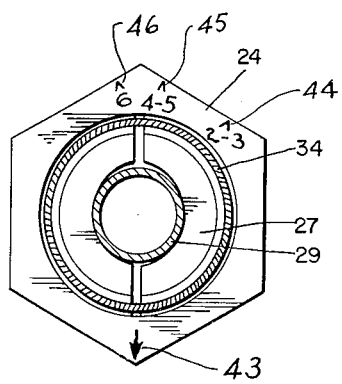
FIG. 2 is an end view along the lines 2—2 of FIG. 1.
Figure 3:
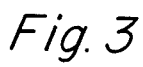
FIG. 3 is an end view along the lines 3—3 of FIG. 1.

The tool includes a body member 10 having a hexagon 11, or other polygonal portion, at one end and a thread 12 at its other end. The polygonal portion 11 is for gripping the tool by means of a vise or wrench.

The body 10 has a bore 13 at one end and a recess 14 at the other end with a transverse shoulder 15 at the bottom of the recess.

Mounted in a recess 14 with a loose sliding fit therein is an annular die member 17 having a bore 18 and an opening for receiving a tube, the opening comprising a short cylindrical bore 19, and a tapered flare mouth 20. The bore 19 of the die member 17 is of a diameter to closely fit the outside diameter of a tube 29 of a size corresponding to the size of the diameter 17. The bore 19 at its lower end terminates in a transverse shoulder 21 which is preferably formed with a reverse taper of approximately 15°, as shown. The die member 17 is preferably made of a high carbon steel hardened throughout, or of some other hard alloy. In some instances it may be made of a softer steel and surface hardened such as by carbonizing. In either case, the die member 17 is made with a heavy enough cross section so that it will not appreciably expand in diameter in the region of the flare mouth 20 so as to stick within the body recess 14 when used for assemblying a ferrule to the tube.

Threaded to the body 10 is a nut 24 having a bore 25 and a transverse clamping shoulder 26. Mounted within the nut 24 is an annular die member 27 split lengthwise into two segments. The die member 27 has a bore 28 for receiving a tube 29 of a size corresponding to the size of the die member 27. The latter also has a bore 30 which terminates in a tapered abutment shoulder 31. On its external surface the split die member 27 has an annular groove 33 for receiving a garter spring 34 for holding the two halves of the split die member 27 together when removed from the nut 24.

Figure 5:
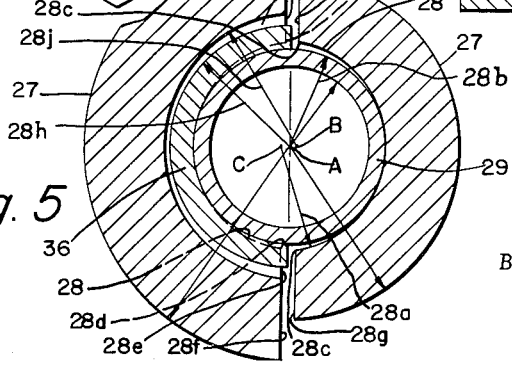
FIG. 5 is an enlarged cross section view along the lines 5—5 of FIG. 1.

As shown in FIG. 5, the semicircular bore portion 28 in each segment is on a radius 28a slightly larger than the radius 28b of the outer diameter of the tube 29 so that when the two segments are brought together the corners 28c and 28d of the segments will be clear of the tube so as not to score or gouge into the same. Likewise, the tapered abutment shoulder 31 is on a radius larger than the corresponding tapered surface of ferrule 36 so that the edges 28e of the tapered shoulder 31 will remain out of contact with the tapered shoulder of the ferrule so as not to score or dig into the ferrule. In other words, when the die segments 27 are brought radially together to their proper position about the tube, there will be circular lines on tapered die surface 31 which corresponds to circular lines on the tapered shoulder of the ferrule but on a larger radius whereby the circular lines will contact only at locations intermediate the radial edges 28e of the tapered surface 31 and such radial edges 28e will remain out of contact with the ferrule shoulder.

The opposed faces 28f, 28g of the split die member 27 are cut back so that they will not come together in the normal fit of the split die members 27 over the tube and ferrule, but will remain separated by a few thousandths of an inch. In this connection, it is pointed out that the width of the split, that is the distance between the faces 28f, 28g and the differential between radii 28a and 28d, as well as behind radii 28h of ferrule 36 and 28j of surface 31 are exaggerated in the drawings so as to clearly illustrate the construction.

To operate the tool, a set of die members 17 and 27 are selected corresponding to the size of the tube 29 upon which a tube coupling ferrule 36 is to be assembled. With the nut 24 and body 10 unthreaded from each other, the die member 17 is placed into recess 14 as shown in FIG. 1.

Figure 4:
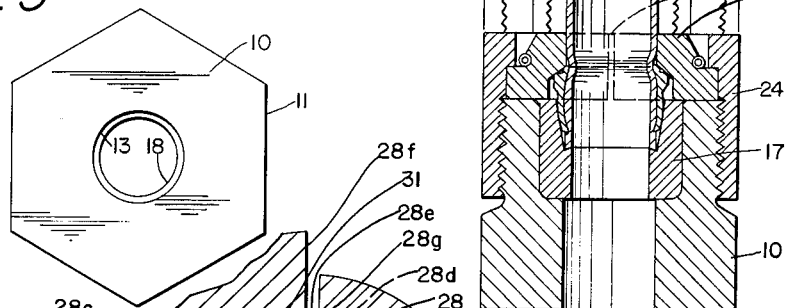
FIG. 4 is a cross section view showing the ferrule in full preset position on the tube, and also showing in phantom outline the position of the coupling nut and tool nut when the tool is to be removed from the tube after the presetting operation.

A coupling nut 16 and the tool nut 24 are then slipped over the tube end and moved back, as shown in phantom in FIG. 4, so that the split die segments 27, held together by garter spring 34, and ferrule 36 may be slipped onto the tube to their proper position. The bore 25 in the tool nut 24 is larger in diameter than the largest transverse dimension of coupling nut 16 so that the tool nut may pass thereover. This permits the coupling nut 16 to be moved back along the tube only the amount necessary to be out of the way of split die member 27. Since the coupling nut 16 normally will not pass over bends in the tube, the bend in the tube must be located far enough back from the tube end to permit the coupling nut to be moved to the position shown in phantom in FIG. 4. Since the coupling nut 24 has relatively large bore 25 it may be passed over coupling nut 16 and bends in the tube to any desired location.

After the split die 27 and the ferrule 36 are in their approximate position on the tube end, the latter is inserted into die 17 until the end of the tube strikes the stop shoulder 21. The tool nut 24 is then brought up to tool body 10 and threaded thereupon. Continued threading of the nut onto the body member 10 causes the tapered shoulder 31 of the die member 27 to engage the rear end of the ferrule to drive it forward along the tube. As the ferrule moves forward, its front edge portion 37 is contracted against the tube by the action of the tapered flare mouth 20, causing the edge 37 to cut its way into the tube to form a sealing and holding shoulder therein. At the same time, the rear end of the ferrule will be contracted a limited extent into vibration dampening engagement with the tube 29 due to the inward camming action of the tapered surface 31.

The parts are so proportioned that the ferrule will be contracted upon the tube the proper amount before the front surface 32 of the split die member abuts the upper surface 23 of the tool body 10, the operator utilizing the indicator marks hereinafter described for determining the proper amount of tightening. If excessive tightening torque is applied, the surface 32 will butt against surface 23 to prevent overtightening to the extent of causing damage.

Because of the relative hardness and heavy section of the die members 17 and 27, the cam surfaces 20 and 31 will not be gouged by the heavy pressure contact with the adjacent portions of the ferrule 36, nor will die member 17 be expanded outwardly to stick within the recess 14. The die member 27, since it is split into two halves, will tend to expand by separation of the two halves, as illustrated by the gap 39 in FIG. 4, due to pressure of the rear end of the ferrule against the tapered surface 31. However, the outer diameter 38 of the split die 27 is a close sliding fit within counterbore 38 of the nut so that only a limited predetermined expansion occurs before further separation and expansion of the two halves is prevented by contact with the nut counterbore 40, as shown in FIG. 4. Such expansion and contact with the nut counterbore 40 is not detrimental since upon relief of pressure by unthreading the nut, the die segments will readily move radially inward again under influence of garter spring 34 and the parts will not stick within the tool nut 24.

After the nut has been threaded onto the body a sufficient distance to properly preset the ferrule 36 upon the tube 29, the nut is unthreaded from the body 10 and moved back along the tube and off from the split die 27. The tube 29 with the attached ferrule is then removed from the die 17. The two halves of the split die member 27 are then separated against the tension of the garter spring 34 a sufficient amount for clearing the ferrule 36 and the die member 27 is slipped off the tube and the tool is ready for reuse.

It will be noted that the bore 13 through the body member 10 is of larger diameter than bore 18 through the die 17. In the event the die member 17 should stick within the recess 14 because of foreign matter lodging in the sliding fit between the two parts, or because of nicks or other damage to the parts, the die member 17 may be readily knocked out of the recess 14 by means of a punch or a rod inserted through the bore 13 into abutment with the lower end of the die 17.

Another feature of the invention is the provision of a means and method for indicating when the nut has been tightened the proper amount for obtaining a predetermined deformation of the ferrule against the tube, and consequently a predetermined grip of the ferrule upon the tube. To accomplish this, the outer transverse surface of the nut is provided with an indicator mark 43, which in this instance is in the form of an arrowhead. This mark is radially spaced from the longitudinal or turning axis of the nut.

The nut is also provided with secondary marks such as 44, 45, and 46. These secondary marks are likewise radially spaced from the axis of the nut and are angularly spaced from the arrow 43 a predetermined amount corresponding to the proper angular turning of the nut from the finger tight position upon the body 10 for obtaining a predetermined deformation of the ferrule 36 and hence a predetermined grip by the ferrule upon the tube.

The mark 44 is for indicating the proper tightening of the nut when tubes of sizes 2 or 3, and inserts 17 and 27 and a ferrule 36 of corresponding size, are used. Likewise, mark 45 is used when the inserts, ferrule, and tube are of size 4 or 5. Mark 46 is used when the ferrule and inserts are for size 6 tube. Additional markings for other corresponding tube sizes may be added as desired.

To utilize the indicating marks when the tool has been assembled with a tube of selected size and with corresponding size inserts and ferrule, the nut is threaded onto body 10 to the finger tight position as shown in FIG. 1. At this time, the angular position of arrow 43 with respect to body 10 is observed. The nut is then tightened with a wrench by turning it until the mark 44, 45, or 46, whichever corresponds to the selected tube size, occupies the observed position of arrow 43 when the nut was in the finger tight position.

This method of indicating the proper tightening of the nut may be applied to an actual coupling as well as to a presetting tool. Thus, if a regular tube coupling body be substituted for the tool body 10 and insert 17, and a regular tube coupling nut be substituted for the nut 24 and insert 27, the markings 43 and the particular mark 44, 45, or 46 corresponding to the particular size of tube coupling, may be applied to the regular tube coupling nut and observed in the same way as described above for determining the proper tightening of the nut beyond the finger tight position.

Although one form of the invention has been illustrated and described, it is apparent that various modifications can be made in the detail embodiment without departing from the scope of the invention as defined by the claims.

I claim:

1. A tool for attaching a ferrule to a tube comprising a body having a recess, an annular die within said recess, said die having an opening for receiving the tube to which the ferrule is to be attached, said opening including a tapered flare mouth facing outwardly of said recess, a nut threadedly attached to said body, a multiple segment split die within said nut and having a bore for receiving said tube, said split die having a shoulder facing said annular die and against which said ferrule is adapted to abut, said split die being movable by said nut toward said annular die as said nut is threaded onto said body for moving said ferrule against said flare mouth whereby said flare mouth will contract said ferrule upon said tube.

2. A tool in accordance with claim 1 in which said split die has a groove in its outer surface and there is a spring ring within said groove for yieldably retaining said segments in position.

3. A tool in accordance with claim 1 in which said split die has an external cylindrical surface closely fitting an internal cylindrical surface of the nut for preventing appreciable separation of said segments when the split die is within said nut.

4. A tool in accordance with claim 1 in which said annular die has an end surface exposed to a bore in said body whereby a pin may be inserted into said body bore into engagement with said annular die for driving the same out of said annular recess in the event said annular die sticks within said recess.

5. A tool in accordance with claim 1 in which said shoulder on said split die is tapered so as to contract the portion of the ferrule engaged thereby against said tube as said split die moves the ferrule against said flare mouth.

6. A tool in accordance with claim 1 in which said split and annular dies are made of relatively harder metal than said nut and body.

7. A tool in accordance with claim 1 in which there is a means for limiting the movement of the split die toward the annular die whereby contraction of the ferrule against the tube may be limited.

8. A tool in accordance with claim 1 in which said split die has a face engageable with said body for limiting movement of said split die toward said annular die whereby contraction of the ferrule against the tube may be limited.

9. A tool in accordance with claim 1 in which said split die has a face engageable with said annular die for limiting movement of said split die toward said annular die whereby contraction of said ferrule against said tube may be limited.

10. A tool for attaching a ferrule to a tube wherein the ferrule is to be clamped between a coupling body and a coupling nut for attaching the tube to said coupling body, said tool comprising a body member having associated therewith a die surface, a multi-segment split die, said die surface flaring outwardly toward said split die, and a tool nut threadable upon said body member, said split die and said die surface being adapted to receive a ferrule therebetween for contracting the same upon a tube, said split die fitting within said tool nut and movable thereby into engagement with said ferrule for contracting the same, said tool nut having a bore therethrough of greater diameter than the largest outside diameter of said coupling nut whereby the tool nut may be passed over said coupling nut back from said split die to permit lateral separation of said split die segments for removal of the same from said tube after the ferrule has been contracted upon said tube.

11. A tool for attaching a ferrule to a tube comprising a body having a tapered flare mouth associated therewith, a nut threaded upon said body, a multiple segment split die within said nut having a bore for receiving said tube, said split die being adapted to fit behind said ferrule and to move the same along the tube, means for moving said split die and said ferrule toward said body whereby said flare mouth will contract said ferrule upon said tube, said split die segments having opposed circumferential ends, the bore in said split die being of slightly greater radius than the radius of the outer surface of the tube, said opposed circumferential ends being spaced apart enough to permit closing of the segments about the tube and in contact therewith at locations intermediate said circumferential ends, the inner longitudinal edges of said circumferential ends being at all times out of contact with said tube.

12. A tool for attaching a ferrule to a tube comprising a body having a tapered flare mouth associated therewith, a nut threaded upon said body, a die within said nut and having longitudinal splits therethrough forming multiple segments movable to radially inward and outward positions, said die having a bore for receiving said tube, said die having a tapered internal shoulder engageable with an annular shoulder on said ferrule for moving the same along the tube, means for moving the split die and said ferrule toward said body whereby said flare mouth will contract said ferrule upon said tube, said tapered shoulder having radial edges formed by said splits, said tapered shoulder having a diameter when the segments are in said outward position greater than a corresponding diameter on said ferrule shoulder whereby when said segments are in said inward radial position said internal tapered shoulder will contact said ferrule at said corresponding diameter only at locations intermediate said radial edges.

13. A tool in accordance with claim 12 in which said die segments have opposed circumferential ends and in which said bore in said die when the die segments are in said outward position has a radius greater than the radius of the outer surface of the tube whereby when said die segments are in said inward radial position the inner longitudinal edges of said circumferential ends are out of contact with said tube.

14. A tool for attaching a ferrule to a tube comprising a body having a recess, an annular die within said recess, said die having an opening for receiving the tube to which the ferrule is to be attached, said opening including a tapered flare mouth facing outwardly of said recess, a nut threadedly attached to said body, a multiple segment split die within said nut and having a bore for receiving said tube, said split die having a shoulder facing said annular die and against which said ferrule is adapted to abut, said split die being movable by said nut toward said annular die as said nut is threaded onto said body for moving said ferrule against said flare mouth whereby said flare mouth will contract said ferrule upon said tube, said nut having an indicator mark at a point on said nut radially spaced from the axis of the nut thread, said nut having a second mark thereon radially spaced from said axis and angularly spaced from said indicator mark an amount corresponding to the proper angular turning of said nut from a finger tight position upon said body for obtaining a predetermined grip by said gripping means upon a tube.

15. A tool for attaching ferrules to tubes comprising a body, said body including means for receiving one of a plurality of interchangeable dies each having an opening for receiving tubes to each of which a ferrule is to be attached, a nut threadably attached to said body, each die opening merging into a tapered flared mouth opening divergingly toward said nut outwardly of said receiving means, a die within said nut, said die having a bore for receiving the tubes, the die within said nut being movable by said nut toward a selected one of said interchangeable dies as said nut is threaded onto said body for moving a ferrule against the flared mouth, said nut having an indicator mark at a point on said nut radially spaced from the axis of the nut thread, said nut having at least a second mark thereon radially spaced from said axis and angularly spaced from said indicator mark, the spacing between said indicator and second marks being of an amount corresponding to the proper angular turning of said nut from a finger tight position upon said body for obtaining a predetermined tightening of the ferrule upon the tube, and said angular spacing being directly related to the diameter and size of the ferrule and tube being attached by the tool.

References Cited by the Examiner

UNITED STATES PATENTS

| | | | |
|---|---|---|---|
| 1,321,324 | 11/19 | Nelson. | |
| 2,333,120 | 11/43 | Parker. | |
| 2,355,871 | 8/44 | Kraft | 285—343 X |
| 2,356,470 | 8/44 | Pelzer et al. | |
| 2,381,748 | 8/45 | Howe | 29—451 X |
| 2,533,943 | 12/50 | Klein. | |
| 2,544,522 | 3/51 | Bertelsen | 29—407 |
| 2,639,754 | 5/53 | Macy. | |
| 2,739,373 | 3/56 | Kane | 29—237 |
| 2,920,384 | 1/60 | Fasoli et al. | 29—407 |
| 2,943,528 | 7/60 | Curry | 85—62 |

FOREIGN PATENTS 54,812 6/23 Sweden.

WHITMORE A. WILTZ, *Primary Examiner.*